United States Patent Office 3,549,383
Patented Dec. 22, 1970

3,549,383
FLUID SHORTENING FOR CAKES
AND CREAM ICINGS
James H. Menzies, Springfield Township, Hamilton County, Ohio, assignor to The Procter & Gamble Company, Cincinnati, Ohio, a corporation of Ohio
No Drawing. Filed Nov. 16, 1967, Ser. No. 683,483
Int. Cl. A23d 5/00
U.S. Cl. 99—92       5 Claims

ABSTRACT OF THE DISCLOSURE

All-purpose fluid shortening containing a combination of four additives: (a) normally solid monoester of glycerol and fatty acid having from about 12 to about 22 carbon atoms and an iodine value of less than 12; (b) monester of polyoxyethylene sorbitan (preferably containing about 20 oxyethylene units per molecule) and fatty acid having from about 14 to about 22 carbon atoms; (c) decaglycerol ester of fatty acid containing per molecule from about 2 to about 5 fatty acid groups having from about 14 to about 22 carbon atoms; and (d) monoester of propylene glycol and fatty acid containing from about 14 to about 26 carbon atoms, at least 20% of the fatty acid containing at least 22 carbon atoms.

BACKGROUND OF THE INVENTION

This invention relates to a fluid shortening which is capable of producing highly desirable layer cakes and similar baked goods and is especially useful in producing highly stable aerated cream icings.

Icings are coatings which can be applied to cakes, sweet rolls, cookies, pastries, and other baked goods and confections. Although the basic ingredients of icings are well known to be sugar and water, the properties and characteristics of icings can be modified by variation of the constituents and additives used in connection with the basic sugar and water. Certain types of icings, generally known as "cream" or "buttercream" icings, contain a substantial proportion of fat or shortening and can be whipped to incorporate a large volume of air. It is the customary practice to use a plastic or solid shortening for preparing such cream-type icings since conventional liquid or fluid shortenings generally do not provide desired properties for this purpose. Icings made with conventional fluid shortenings tend to slump and bleed liquids, and do not have the air incorporation and/or stability properties of icings made with plastic shortenings.

Prior art attempts to prepare a fluid shortening for use in a cream-type icing have, on occasion, been successful except that optimum functionality in other uses such as the preparation of layer cakes and the like is often sacrificed. The overall convenience, such as ease of handling and similar properties, of fluid shortenings are well recognized. It is also recognized that users of such products, which range from large scale commercial bakers to the individual housewife, would be benefited by the provision of a truly all-purpose fluid shortening, i.e., one that is capable of use in the preparation of both cream icings and other products such as layer cakes. An all-purpose fluid shortening for use in cream icings having high volume (air incorporation ability) and stability is especially desirable.

Such all-purpose shortenng products as those described above have recently been developed. These products generally contain at least one or more additives to impart certain functional properties to the shortening for its varied end uses. An example of a fluid shortening suitable for use in cream icings or cakes is disclosed in U.S. Pat. 3,208,857, Howard and Koren, Sept. 28, 1965. This fluid shortening composition contains a hydrogenated vegetable phosphatide combined with specified surface active adjuvants such as a high molecular weight saturated fatty acid.

A fluid or plastic shortening for use in cream icings or cakes and which contains a combination of four functional additives is disclosed in copending application of Richard T. Darragh and Kenneth W. Nelson, commonly assigned, Ser. No. 422,048, filed Dec, 29, 1964, now U.S. Pat. 3,397,996. These four additives are: (1) monoglyceride of fatty acid, (2) polyoxyethylene sorbitan monoester of fatty acid, (3) decaglycerol ester of fatty acid, and (4) half ester of dicarboxylic acid and fatty acid monoester of straight chain aliphatic diol. In another copending application of Kenneth W. Nelson, commonly assigned, Ser. No. 509,219, filed Nov. 22, 1965, now U.S. Pat. 3,429,714, a combination of three functional additives for use in a plastic shortening suitable for the preparation of cream icings or cakes is disclosed. These three additives are: (1) monoglyceride of fatty acid, (2) polyoxyethylene sorbitan monoester of fatty acid, and (3) monoester of propylene glycol and fatty acid.

SUMMARY OF THE INVENTION

The present invention utilizes a quaternary combination of additives, some of which are utilized in each of the above-mentioned copending applications. More specifically, three of the additives of the present invention are the same as those disclosed for use in a plastic shortening in application Ser. No. 509,219, new U.S. Pat. 3,429,714, except that certain specific monoglycerides (hardened to a maximum I.V. value) and certain specific propylene glycol monoesters (containing a minimum amount of $C_{22}$ or higher fatty acid) are required herein. The fourth additive of the present invention is a decaglycerol ester which is disclosed as one of the additives in the quaternary combination of Ser. No. 422,048, now U.S. Pat. 3,397,996.

In essence then, this invention provides an all-purpose (suitable for the preparation of cream icings and other baked products such as layer cakes) fluid glyceride shortening containing as additives: (a) from about 0.5% to about 5.0% normally solid monoester of glycerol and fatty acid having from about 12 to about 22 carbon atoms and an Iodine Value of less than 12; (b) from about 0.5% to about 3.0% monoester of polyoxyethylene sorbitan (preferably containing about 20 oxyethylene units per molecule) and fatty acid having from about 14 to about 22 carbon atoms; (c) from about 0.2% to above 2.0% decaglycerol ester of fatty acid containing per molecule from about 2 to about 5 fatty acid groups having from about 14 to about 22 carbon atoms; and (d) from about 1% to about 5% monoester of propylene glycol and fatty acid containing from about 14 to about 26 carbon atoms, at least 20% of the fatty acid containing at least 22 carbon atoms.

The additives set forth above cooperate to provide improved performance in the all-purpose fluid shortening of the invention. More specifically, improvements are obtained in cakes and especially in icings with the all-purpose fluid shortening of the invention which employs these four additives in combination as compared to similar-type shortenings from which one or more of these additives is left out or modified as discussed in more detail below in regard to each additive. In other words, the present invention is not predicated on the use of these additives in fluid shortening either alone or in binary or ternary combination but lies in the unique combination of all four additives in the concentrations described and in the fluid shortening improvements obtained with this combination.

As noted immediately above, the overall combination of components is important in this invention. A particular and noteworthy feature of the invention is the selection of a specific monoester of propylene glycol and fatty acid which contains a minimum amount (20%) of fatty acid containing at least 22 carbon atoms, e.g., behenic acid. This specific propylene glycol monoester component provides unexpectedly improved cream icing stability as compared to, for example, a propylene glycol monoester of fatty acid containing primarily 18 carbon atoms, e.g., stearic acid. In a preferred embodiment of the invention, the fluid shortening is processed in a certain manner so that the propylene glycol monoester component is dissolved in the oil phase. This method provides improved functionality of the propylene glycol monoester component in regard to icing stability.

DESCRIPTION OF THE PREFERRED EMBODIMENTS

All percentages and ratios herein are by weight.

The fluid shortenings of this invention are comprised of fatty glycerides and are generally a combination of a liquid base oil or liquid vehicle portion and a hardstock solid portion which is preferably suspended in the liquid portion. These shortening ingredients can be saturated or unsaturated and they can be, or can be derived from, naturally-occurring fats and oils as well as synthetically-prepared glycerides or fractions or mixtures thereof. In general, these glycerides contain fatty acid groups having from about 12 to about 24 carbon atoms such as the fatty acid groups of lauric, myristic, palmitic, stearic, oleic, linoleic, linolenic, arachidic, behenic, and erucic acids.

Examples of suitable liquid base oils are cottonseed, soybean, peanut, safflower, sesame, sunflower, and rapeseed oils. Fish oils such as herring, menhaden, and whale oil can also be used. Also suitable are liquid oil fractions obtained from palm oil, lard, and tallow, as for example, by graining or directed interesterification followed by separation of the oil. Oils predominating in glycerides of unsaturated acids may require some hydrogenation to maintain flavor, but the hydrogenation should be kept to a minimum. Also suitable are the so-called low molecular synthetic fats which are certain di- or triglycerides in which one of the two hydroxyl groups of the glycerine has been esterified with acetic, propionic, butyric, or caproic acids and one or two of the remaining hydroxyl groups of the glycerine have been esterified with higher molecular weight fatty acids having from 12 to 22 carbon atoms.

Any mixture of the above enumerated liquid glyceride vehicles can be used in preparing the fluid shortenings of the present invention. Refined and winterized cottonseed oil or refined and partially hydrogenated soybean oil (I.V. of about 110±10) and mixtures thereof are preferred for use as glyceride base oils in the fluid shortenings of this invention.

The hardstock solids are preferably suspended in the liquid glyceride vehicle in the fluid shortenings of this invention and are generally triglyceride solids which are preferably substantially fully saturated fatty triglycerides having from about 16 to 22 carbon atoms. Preferably, these fatty triglyceride solids have an iodine value not greater than about 12, and more preferably have an iodine value of about 8. Preferably, the hardstock is beta-phase-tending such as tristearin, tripalmitin, and symmetrical palmitodistearin. Other suitable triglyceride solids having strong beta-forming tendencies can be derived from substantially completely saturated fats and oils such as lard, sunflower oil, safflower oil, linseed oil, sesame seed oil, hazelnut oil, soybean oil, peanut oil, olive oil, and corn oil. A highly preferred beta-phase-tending triglyceride hardstock is refined soybean oil substantially completely hydrogenated (to an I.V. of about 8).

The fluid shortenings of this invention generally contain from about 75% to about 95% of the liquid base oil, from about 1% to about 20% of the hardstock, and from about 2% to about 15% of the quaternary combination of additives. A preferred fluid shortening contains from about 80% to about 90% liquid base oil, from about 2% to about 10% hardstock, and from about 5% to about 10% of the quaternary combination of additives.

The solid components of the fluid shortening such as triglyceride hardstock and/or the normally solid monoglyceride additive are preferably present primarily (at least 60%, more preferably at least 80%) in the beta phase as opposed to an alpha phase or a beta-prime phase. These crystalline structures can be identified by their X-ray diffraction patterns and are described in detail in U.S. Pats. 2,521,242 and 2,521,243, granted to Mitchell, Sept. 5, 1950. A beta phase crystalline structure is desirable to enhance the fluidity characteristics of the shortening and it promotes the formation of a stable suspension of undissolved solids in the liquid triglyceride base oil. Methods of preparing such fluid shortenings and of suspending the solid components therein are described in U.S. Pats. 2,815,285 and 2,815,286, and are discussed in detail hereinafter.

The fluid shortening composition of this invention contains a quaternary combination of additives:

(a) The fluid shortening contains from about 0.5% to about 5%, preferably from about 1% to about 4%, normally solid monoester of glycerol and fatty acid. These normally solid or "hardened" monoglycerides can be pure esters of glycerol and fatty acids having from about 12 to about 22 carbon atoms such as, for example, monobehenin, monopalmitin, and monostearin, or mixtures of esters montaining such fatty acids. They are conveniently prepared by the superglycerination of fats or oils which consists of reacting a triglyceride fat or oil, for example, cottonseed or soybean oil, with excess glycerine in the presence of an alkaline catalyst such as sodium hydroxide.

Edeler and Richardson, U.S. Pats. 2,206,167–168, granted July 2, 1940, describe typical methods of making edible mono- and diglycerides by the superglycerination of fats. These mono- and diglyceride mixtures usually contain on the order of 40% to 60% monoglyceride, the balance comprising diglyceride and a smaller percentage of triglyceride. Such mixtures can be used in the practice of this invention provided that the total monoglyceride content in the fluid glyceride shortening composition is from about 0.5% to about 5.0% as set forth herein. The so-called "distilled" monoglyceride products which are characterized by having a higher monoglyceride content, commonly on the order of 90% or more, can also be used. Such products are marketed under the trade mark "Myverol" and methods of preparing them are described by Kuhrt, U.S. Pats. 2,634,278,–279, granted Apr. 7, 1953, Kuhrt, U.S. Pat. 2,701,769, granted Feb. 8, 1955, and Kuhrt and Welch, U.S. Patent 2,727,913, granted Dec. 20, 1955. The monoglyceride is "hardened" and is normally solid in form, i.e., has an iodine value less than about 12 and preferably has an iodine value of about 8. Useful normally solid monoglycerides can be derived from saturated fatty acids or can be prepared by superglycerinating substantially completely saturated triglycerides such as hardened soybean oil. A preferred compound is a monoglyceride of substantially completely hydrogenated soybean oil (I.V. 8). This material contains fatty acid groups having from about 16 to about 18 carbon atoms.

The monoglyceride additive is important to the fluid shortening in the preparation of layer cakes and cream icings, and particularly to the structure of cakes and the stability of cream icings.

(b) The fluid shortening contains from about 0.5% to about 3%, preferably from about 1% to about 1.5% monoester of polyoxyethylene sorbitan (preferably containing about 20 oxyethylene units per molecule) and fatty acid having from about 14 to about 22 carbon atoms. This material can be prepared, for example, by reacting polyoxyethylene sorbitan with fatty acids having from about 14 to about 22 carbon atoms such as palmitic, stearic, and oleic acids, or mixtures thereof, or by forming polyoxyethylene ethers of partial fatty acid sorbitan esters. Commercially available products are marketed under the trademark "Tween." Preferred fatty acids in these materials contain from about 16 to about 18 carbon atoms. Suitable methods of preparation are described by Griffin, U.S. Pat. 2,380,166, granted July 10, 1945. In the preparation of these materials a complex mixture of compounds is usually formed. Such mixtures are included within the scope of this invention. Polyoxyethylene (20) sorbitan monostearate, which has an average of about 20 oxyethylene units per molecule, is the preferred material in this group of additives for the present invention and is available under the designation "Tween 60." When using a commercial product such as "Tween 60," it is preferred to acid-treat the polyoxyethylene sorbitan monoester with sufficient acid to give it a pH of 6.5 to 7.0 in the presence of a trace of water. Edible acids such as phosphoric, citric, or hydrochloric acid can be used for this purpose. The trace of water need merely be an amount sufficient to enable the making of a conventional pH determination.

The polyoxyethylene sorbitan monoester additive is important to the fluid shortening as an aerating agent in the preparation of cake batters and cream icings, particularly in regard to icing volume.

(c) The fluid shortening contains from about 0.2% to about 2%, preferably from about 0.4% to about 1% decaglycerol ester of fatty acid. These materials are polyglycerol esters containing about 10 units of glycerol and from about 2 to about 5 fatty acid groups per molecule. The polyglycerol essentially is a polymer which is formed by the dehydration of glycerine. For each unit of glycerine that is added to the polymer chain there is an increase of one hydroxyl group, and in the polyglycerols useful in the present invention from about 2 to about 5 of these hydroxyl groups of the decaglycerol molecule form ester links with fatty acids having from about 14 to about 22 carbon atoms, or mixtures thereof. It should be understood that in actual practice the decaglycerol ester will usually contain a mixture of components having an average of 10 glycerol units and an average of from about 2 to about 5 fatty acid groups. Such mixtures are within the scope of this invention. Suitable methods of forming these esters are disclosed by Harris, U.S. Pats. 2,022,766 and 2,023,388, both granted Dec. 3, 1935, and in Belgian Pat. 623,179 (1963). A preferred polyglycerol ester is a decaglycerol triester of partially hydrogenated vegetable oil having an iodine value not exceeding about 45 and containing fatty acid groups having from about 16 to about 18 carbon atoms. Such a material has been obtained commercially under the name "Drewpol 10-3-sh."

The decaglycerol ester additive is important to the fluid shortening as an emulsifier in dispersing the shortening in an aqueous phase, e.g., in cake making, and particularly in improving stability of a cream icing.

(d) The fluid shortening contains from about 1% to about 5%, preferably from about 2% to about 4% mono ester of propylene glycol and fatty acid. These materials are monoesters of fatty acids having from about 14 to about 26 carbon atoms, such as, for example, lauric, myristic, palmitic, stearic, oleic, arachidic, behenic, erucic, lignoceric and shibic acids, or mixtures thereof. It is essential to the practice of this invention (especially for the purpose of cream icing stability) that at least 20% of the monoester content is derived from fatty acids containing at least 22 carbon atoms. Preferably at least 35% of the monoester content is derived from fatty acids containing at least 22 carbon atoms, e.g., behenic acid. The fatty acids obtained from fats such as rapeseed oil, menhaden oil, and crambe oil provide a suitable $C_{22}$ fatty acid content. Propylene glycol monobehenate represents a preferred compound. These propylene glycol monoesters of higher fatty acids are normally solid. Preferably, they have an iodine value of less than about 12 and more preferably an iodine value of about 8.

The propylene glycol monoester component can be prepared by reaction of propylene glycol with suitable fatty acids or commercial mixtures of various such acids such as double or triple pressed stearic and behenic acids, in the presence of acid or alkaline catalysts, to form monoesters by conventional esterification methods. By analogous methods, the propylene glycol can be reacted with fats having the proper fatty acid groups such as rapeseed oil, in the presence of acid or alkaline catalysts, to form propylene glycol monoesters by conventional interesterification methods. Other suitable methods for the preparation of propylene glycol monoesters of fatty acid by direct esterification or interesterification are described by Arrowsmith et al., U.S. Pat. 2,383,581; Allen et al., U.S. Pat. 2,478,354; Logan, U.S. Pat. 2,669,572; Kuhrt, U.S. Pat. 2,634,278; and Abbott, U.S. Pat. 3,145,110. A preferred propylene glycol monoester is superglycolated substantially completely hydrogenated rapeseed oil (I.V. 8).

The propylene glycol monoester additive is important to the fluid shortening as an alpha phase crystal-tending emulsifier in the preparation of cakes, and particularly in improving cream icing stability.

The fluid shortenings of this invention can be prepared in manners known in the art wherein the fatty glyceride solids are dispersed in the liquid glyceride vehicle in such manner and in such form that the shortening remains in a pumpable or fluid condition over the normal range of handling temperatures and does not form a rigid, non-fluid plastic shortening. Methods for preparing shortenings of this nature are described in U.S. Pats. 2,521,219 and 2,521,242, both issued Sept. 5, 1950, and U.S. Pats. 2,815,285 and 2,815,286, both issued Dec. 3, 1957.

Preferably, the fluid shortenings of this invention are processed in such a manner that the solid components, e.g., the solid triglyceride hardstock and the solid monoglyceride additive, are obtained as a stable suspension in the base oil. As noted previously, it is preferred that these components are present primarily in the beta phase. This stable suspension of beta phase solids can readily be achieved by processing the shortening composition according to the teaching of U.S. Pat. 2,815,286, granted to Andre and Going, Dec. 3, 1957. The main steps can include heating the shortening composition to a temperature high enough to melt all the solids, rapidly chilling to form small crystals, then warming to between 90° F. and 110° F. to promote a change of the solid fat from the alpha and beta-prime phases to a beta phase either with or without seeding with beta phase crystals. An alternative method is to warm the rapidly-chilled mixture to a temperature above the melting point of the alpha and beta-prime phases, but below the melting point of the beta phase crystals, and then to cool the mixture using the beta phase crystals already present as the seed crystal.

An added tempering step of one to two days at 80° F. to 90° F. after packing is desirable. This process results in forming a stable suspension of primarily beta phase undissolved hardstock and other solid components, including the monoglyceride additives, in the base oil. The additional additives, i.e., the polyoxyethylene sorbitan monoester, the decaglycerol fatty acid ester, and the propylene glycol monoester, can then be added to the fluid shortening composition by homogeneously admixing therewith. Alternatively, these additives can be incorporated, in process, into the fluid shortening in the same manner as the hardstock component or monoglyceride additive described immediately above.

It has been discovered, however, that the functionality of the fluid shortenings of this invention in cream icings, and particularly the contribution of the propylene glycol monoester additive to cream icing stability, is greatly enhanced if the shortening is processed in a specific way disclosed as follows: The liquid base oil is first divided into two portions, a minor portion for the preparation of a "concentrate," and a major portion for the preparation of a "dilute" oil portion. The portion appropriated for the dilute oil should constitute at least 51% and preferably from about 60% to about 80% of the total liquid base oil.

The hardstock solids and the normally solid monoglyceride additive are added to the minor portion which is then processed, for example, in the manner described above according to the teachings of U.S. Pat. 2,815,286, to form a concentrate portion of primarily beta phase solids suspended in the liquid vehicle.

The propylene glycol monoester additive is added to the major portion of base oil which is heated to a temperature greater than about 80° F., preferably to a temperature within the range of from about 90° F. to about 110° F. (to dissolve the propylene glycol monoester) and is then slowly cooled to room temperature, preferably from about 65° F. to about 75° F., whereby the propylene glycol monoester component remains dissolved in the dilute oil portion which is obtained as a clear liquid. The propylene glycol monoester, although normally a solid, is soluble in liquid oil, particularly when the oil is heated to a temperature above the melting point of the monoester and is then slowly cooled.

The concentrate and dilute oil portions of the fluid shortening are then blended together and the additional additives are homogeneously admixed therewith, preferably by vigorous agitation in a turbine mixer, and preferably in the absence of air.

The preferred process outlined above (where the propylene glycol monoester is added to a concentrate portion as a clear solution in the dilute oil portion) results in a fluid shortening product having the propylene glycol monoester component dissolved in the oil phase. This product provides superior performance, particularly in regard to icing stability, as compared to a product where the propylene glycol monoester is present as a solid, e.g., where this component has been "pasticized" with the hardstock and/or solid monoglyceride components.

In summary, a preferred process for preparing the fluid shortening of this invention comprises:

(1) dividing the liquid base oil into a major portion and a minor portion;

(2) adding the hardstock and normally solid monoester of glycerol and fatty acid additive to the minor portion of the liquid base oil of step (1) to form a concentrate of primarily beta-phase solids suspended in the liquid vehicle;

(3) dissolving the monester of propylene glycol and fatty acid additive in the major portion of liquid base oil of step (1) to form a clear solution; and (4) combining the concentrate of step (2), the clear solution of step (3), the monoester of polyoxyethylene sorbitan and fatty acid additive, and the decaglycerol ester additive.

EXAMPLE I

A fluid shortening having the following composition was prepared in the manner described below:

| Ingredient: | Percent by weight |
|---|---|
| Fluid glyceride shortening base— Comprising 86.5% refined soybean liquid base oil partially hydrogenated to an I.V. of about 107, and 3.0% refined soybean oil hardstock solids substantially completely hydrogenated to an I.V. of about 8 | 89.5 |
| Monoester of polyoxyethylene sorbitan and fatty acid— Polyoxyethylene (20) sorbitan monostearate ("Tween 60") acid-treated to a pH of about 7.0 in a trace of water | 1.0 |
| Decaglycerol ester of fatty acid— Decaglycerol triester of vegetable oil fatty acids analyzed as decaglycerol triester of partially hydrogenated cottonseed oil—predominantly $C_{16}$–$C_{18}$ fatty acids ("Drewpol 10–3–sh"—I.V.—maximum of 45) | 0.5 |
| Normally solid monoester of glycerol and fatty acid— Solid monoglycerides as a mixture of mono-, di- and triglycerides (1:1:0.8 by weight mono- to di- to tri-) of substantially completely hydrogenated soybean oil having an I.V. of about 8. (Total shortening basis: 1.6% solid $C_{16}$–$C_{18}$ monoglyceride) | 4.5 |
| Monoester of propylene glycol and fatty acid— Superglycolated substantially completely hydrogenated rapeseed oil (I.V. 8) containing 60% propylene glycol monoesters (5.8% $C_{16}$, 45.0% $C_{18}$, 10.0% $C_{20}$, and 39.2% $C_{22}$), and 40% unreacted mono-, di-, and triglycerides of rapeseed oil. (Total shortening basis: 2.7% propylene glycol monoester of $C_{16}$–$C_{22}$ fatty acid containing 39.2% $C_{22}$) | 4.5 |
| Total shortening | 100.0 |

The fluid shortening composition was prepared as follows: The soybean liquid base oil was divided into two portions, a minor portion containing 22.5% of the total oil and a major portion containing 77.5% of the total oil. A concentrate was prepared by adding the hardstock and normally solid monoester of glycerol and fatty acid components to the minor portion of base oil, melting together the ingredients at a temperature of 150° F., passing the melted mixture through a scraped wall heat exchanger (Votator "A" unit) in about 1 minute to a temperature of 85° F., and then through a picker box in about 20 minutes (Votator "B" unit) to a temperature of 105° F. The mixture of liquid base oil and crystallized glycerides was then heated to 110° F. in a heat exchanger and passed into a tempering tank where it was held for 4 hours at 110° F. with mild agitation to form a concentrate. The solids were greater than 80% in the beta phase and were uniformly suspended in the base oil. The concentrate comprised 75% liquid base oil and 25% solids (15% hardstock and 10% solid monoester of glycerol and fatty acid).

A dilute oil solution was prepared by adding the monoester of propylene glycol and fatty acid to the major portion of liquid base oil, heating to 100° F., and then allowing the mixture to cool to 70° F. A clear solution was obtained which comprised 94% liquid base oil and 6% monoester of propylene glycol and fatty acid.

The final fluid shortening product was then prepared by admixing the concentrate, the clear solution, the monoester of polyoxyethylene sorbitan and fatty acid, and the decaglycerol ester of fatty acid together in a closed reaction vessel equipped with a power mixer.

The fluid shortening product had desirable rheological and other physical characteristics, e.g., a Saybolt viscosity at 70° F. of 10 gms./30 seconds, and was found to be highly satisfactory for the preparation of cakes and cream icings.

EXAMPLE II

A high-ratio white cake was prepared by admixing the following ingredients to form a batter, adding 454 grams of the batter to an 8-inch cake pan (one layer), and baking minutes at 550° F.

| Ingredient: | Grams |
| --- | --- |
| Cake flour | 454 |
| Shortening (the shortening of Example I) | 250 |
| Sugar | 636 |
| Salt | 17 |
| Baking powder | 28 |
| Water | 380 |
| Nonfat dry milk solids | 45 |
| Frozen egg whites | 340 |

The layer was satisfactory in all respects. It had a center height of 1.87 in. and an edge height of 1.35 in.

This cake was found to be superior in volume, and judged to be equal in all other respects, as compared to a control cake prepared with a leading commercially available brand of fluid shortening.

EXAMPLE III

A yellow pound cake was prepared by admixing the following ingredients to form a batter, adding 454 grams of the batter to a pound cake pan, and baking for 65 minutes at 550° F.

| Ingredients: | Grams |
| --- | --- |
| Cake flour | 454 |
| Shortening (the shortening of Example I) | 318 |
| Sugar | 545 |
| Salt | 17 |
| Nonfat dry milk solids | 28 |
| Whole eggs | 318 |
| Water | 208 |

This cake was satisfactory in all respects. It had a volume of 1241 cc., as compared to 1124 cc. for a control cake prepared with a leading commercially available brand of fluid shortening.

EXAMPLE IV

A cream icing was prepared by admixing the following ingredients in a paddle mixer.

| Ingredients: | Grams |
| --- | --- |
| 6X powdered sugar | 908 |
| Shortening (the shortening of Example I) | 227 |
| Nonfat dry milk solids | 57 |
| Salt | 7 |
| Water | 155 |

The icing had a very good specific volume of 1.51 and had excellent qualities for a cream-type icing such as a firm body and no slump or leakage of oil upon standing for 30 minutes.

The stability of the icing was determined by uniformly icing the outside surface of conventional 8-inch cake pans and storing, covered and uncovered, overnight at 70° F. and at 90° F. The iced pans were then observed and the stability grade determined by comparing to a chart showing eight photographs of iced pans each having a different icing stability grade on a scale of 1 to 8, wherein a grade of 1 indicates essentially no stability and a grade of 8 indicates exceptionally good stability. Stability data for the icing of this example are shown in the table below.

For comparative purposes, an identical icing was prepared except that superglycolated substantially completely hydrogenated soybean oil (I.V. 8) was substituted on an equal weight basis for the superglycolated substantially completely hydrogenated rapeseed oil (I.V. 8) as the monoester of propylene glycol and fatty acid additive in the shortening. The substituted additive contained 60% propylene glycol monoesters (10% $C_{16}$ and 90% $C_{18}$) and 40% unreacted mono-, di- and triglycerides of soybean oil. (Total shortening basis: 2.7% propylene glycol monoester of $C_{16}$–$C_{18}$ fatty acid.) Stability data for this icing are also found in the following table.

ICING STABILITY

| Stability grade | | Example icing [1] | Comparative icing [2] |
| --- | --- | --- | --- |
| 70° F | Covered | 7 | 4 |
| | Uncovered | 8 | 7 |
| 90° F | Covered | 6 | 1 |
| | Uncovered | 7 | 3 |

[1] Shortening contained 2.7% propylene glycol monoester of $C_{16}$–$C_{22}$ fatty acid of which 39.2% was $C_{22}$.
[2] Shortening contained 2.7% propylene glycol monoester of $C_{16}$–$C_{18}$ fatty acid of which 90% was $C_{18}$.

It can be seen from the above table that the example icing which contained the specified amount of $C_{22}$ propylene glycol monoester exhibited significantly superior stability, especially at high storage temperatures, as compared to the icing which contained only $C_{16}$–$C_{18}$ propylene glycol monoester.

In the above Examples II, III and IV, substantially equivalent results are obtained in the preparation of cakes and cream icings when the fluid shortening of Example I is replaced on a weight basis by one of the following fluid shortenings:

EXAMPLE V

| Ingredient: | Percent by weight |
| --- | --- |
| Fluid base— | |
| 1:1 mixture of cottonseed and soybean oils, I.V.—110 | 88 |
| Hardstock— | |
| Tristearin | 5 |
| Additives— | |
| Monostearin | 3 |
| Polyoxyethylene (20) sorbitan monostearate | 1 |
| Decaglycerol distearate | 1 |
| Propylene glycol monobehenate | 2 |

EXAMPLE VI

| Ingredient: | Percent by weight |
| --- | --- |
| Fluid base— | |
| 1:1:1 mixture of cottonseed, soybean and safflower oil, I.V.—115 | 80 |
| Hardstock— | |
| Tripalmitin | 10 |
| Additives— | |
| 1:1 mixture of monopalmitin and monostearin | 4 |
| Polyoxyethylene (20) sorbitan monooleate | 2 |
| Decaglycerol pentabehenate | 0.5 |
| 1:1 mixture of propylene glycol monostearate and propylene glycol monobehenate | 3.5 |

EXAMPLE VII

| Ingredient: | Percent by weight |
| --- | --- |
| Fluid base— | |
| Refined and winterized cottonseed oil | 83 |
| Hardstock— | |
| Safflower oil hydrogenated to an I.V. of about 8 | 4 |
| Additives— | |
| Monoglycerides of cottonseed oil hydrogenated to an I.V. of about 8 | 5 |
| Polyoxyethylene (20) sorbitan monoesters of soybean oil | 1 |
| Decaglycerol tetraesters of soybean oil | 2 |
| 1:1:1 mixture of propylene glycol monopalmitate, propylene glycol monostearate, and propylene glycol monobehenate | 5 |

EXAMPLE VIII

| Ingredient: | Percent by weight |
|---|---|
| Fluid base— | |
| Refined and bleached soybean oil, I.V.—100 | 81 |
| Hardstock— | |
| Peanut oil hydrogenated to an I.V. of about 8 | 9 |
| Additives— | |
| Monostearin | 3 |
| Polyoxyethylene (20) monoesters of cottonseed oil | 3 |
| Decaglycerol triester of cottonseed oil | 2 |
| Propylene glycol monoester of rapeseed oil hydrogenated to an I.V. of about 12 | 2 |

What is claimed is:

1. All-purpose fluid glyceride shortening comprising from about 80% to about 90% liquid base oil, from about 2% to about 10% hardstock and contains as additives:
   (a) from about 0.5% to about 5.0% normally solid monoester of glycerol and fatty acid having from about 12 to about 22 carbon atoms and an Iodine Value of less than about 12;
   (b) from about 0.5% to about 3.0% monoester of polyoxyethylene sorbitan and fatty acid having from about 14 to about 22 carbon atoms;
   (c) from about 0.2% to about 2.0% decaglycerol ester of fatty acid containing per molecule from about 2 to about 5 fatty acid groups having from about 14 to about 22 carbon atoms; and
   (d) from about 1% to about 5% monoester of propylene glycol and fatty acid containing from about 14 to about 26 carbon atoms, at least 20% of the fatty acid containing at least 22 carbon atoms.

2. The shortening of claim 1 wherein the liquid oil is selected from the group consisting of cottonseed oil, soybean oil and mixtures thereof, the hardstock is substantially completely hydrogenated soybean oil, additive (a) is monoglyceride of substantially completely hydrogenated soybean oil, additive (b) is polyoxyethylene (20) sorbitan monostearate, additive (c) is decaglycerol triester of partially hydrogenated vegetable oil having an I.V. not exceeding about 45 and containing fatty acid groups having from about 16 to about 18 carbon atoms, and additive (d) is superglycolated substantially completely hydrogenated rapeseed oil.

3. The shortening of claim 2 wherein additive (d) is propylene glycol monobehenate.

4. Cake containing the shortening of claim 1.

5. Icing containing the shortening of claim 1.

References Cited

UNITED STATES PATENTS

| | | | |
|---|---|---|---|
| 3,069,270 | 12/1962 | Handschumaker et al. | 99—118X |
| 3,145,110 | 8/1964 | Abbott | 99—118 |
| 3,194,666 | 7/1965 | Bedenk et al. | 99—139 |
| 3,208,857 | 9/1965 | Howard et al. | 99—123 |
| 3,397,996 | 8/1968 | Darragh et al. | 99—118 |
| 3,429,714 | 2/1969 | Nelson | 99—118 |

OTHER REFERENCES

Linteris et al.: Journal of the American Oil Chemists' Society, vol. 35, January 1958, pp. 28–32.

Nash et al.: The Bakers Digest, October 1963, pp. 72–75.

JOSEPH M. GOLIAN, Primary Examiner

U.S. Cl. X.R.

99—118, 123, 139